Patented Sept. 2, 1924.

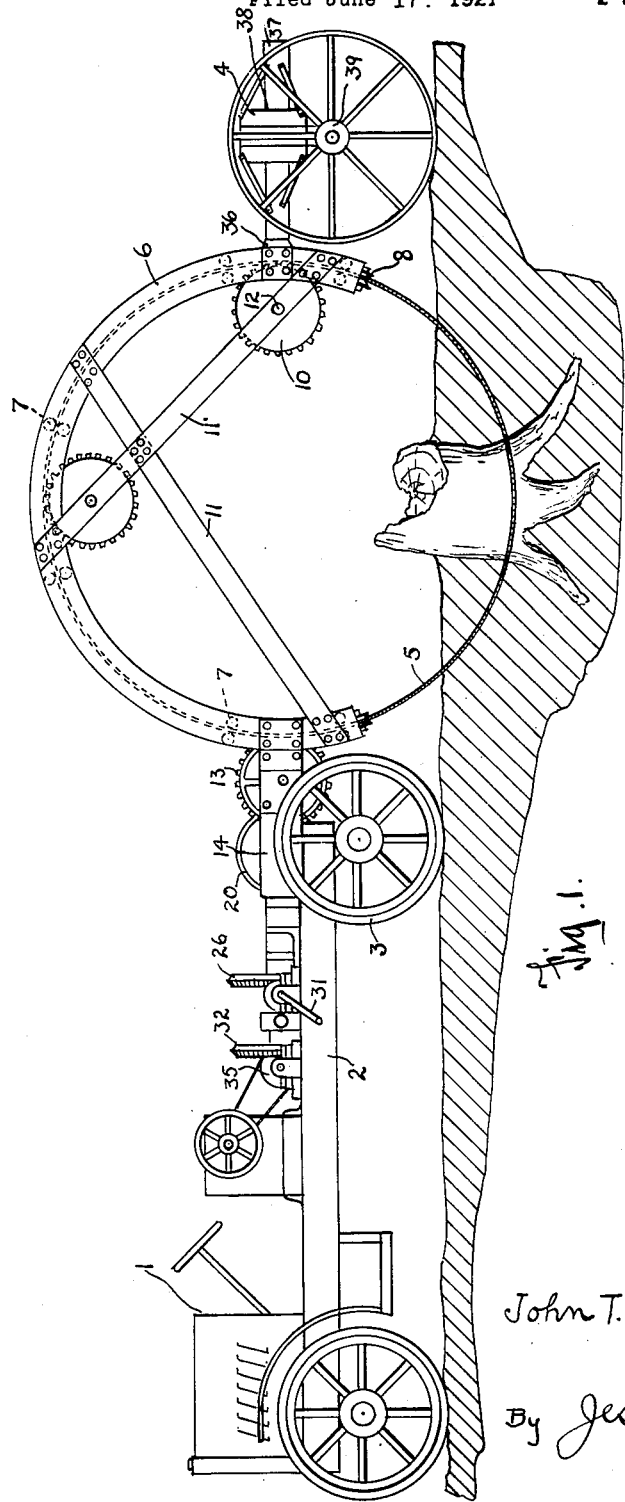

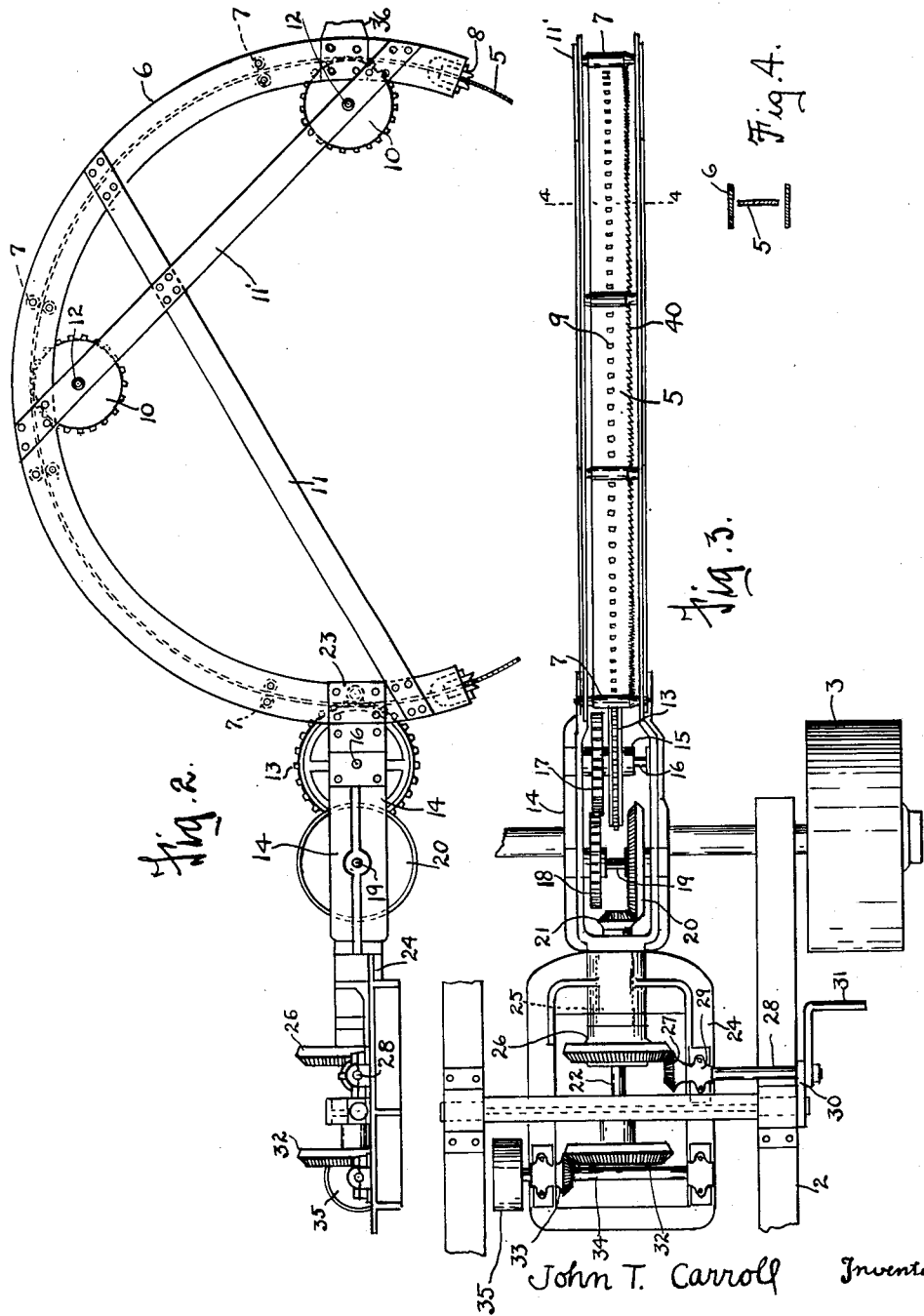

1,507,460

UNITED STATES PATENT OFFICE

JOHN T. CARROLL, OF HOUSTON, TEXAS.

ROTARY HOOP SAW.

Application filed June 17, 1921. Serial No. 478,399.

*To all whom it may concern:*

Be it known that I, JOHN T. CARROLL, a citizen of the United States, residing at Houston, Harris County, Texas, have invented a certain new and useful Improvement in Rotary Hoop Saws, of which the following is a full, clear, and exact description, such as will enable others skilled in the art to which it appertains to make and use the same.

My invention relates to rotary hoop saws, particularly adapted to the severing of tree-stumps below the surface of the ground.

It has particular application to the cutting of pine stumps in the clearing of land, or in the making of turpentine and other pine products. It is not confined to such use, however, and may be used in clearing land of all kinds of timber growth.

The object of my invention is to provide a power operated saw which is portable and easily operated by means of a low powered motor, and which is adapted to saw off stumps or trees below the surface of the ground quickly and expeditiously. This and other objects are accomplished by my invention which has particular relation to certain novel features of construction, operation and arrangement of parts, particularly set forth and described in the specification which follows.

Referring to the drawing herewith, wherein like parts are designated by like numerals of reference throughout the several views: Fig. 1 is a side elevation of my improved saw, showing it in position after severing a stump. Fig. 2 is a detail, somewhat enlarged, showing the mounting of the saw and its operating means. Fig. 3 is a top plan view of the detail shown in Fig. 2. Fig. 4 is a transverse section on the line 4—4 of Fig. 3.

In developing the saw for use in removing stumps from cut-over lands I have provided a means for mounting the saw in a frame work for operation, and have supported this framework on a carriage or vehicle by means of which the saw may be moved from place to place in its operation. In Fig. 1 I have shown a means of mounting the framework of the saw upon the rear end of an automobile truck, having side supporting plates 2, the main operating machinery being located at the rear of the truck and over the axles of the rear wheel 3. The rearward end of the framework in which the saw is mounted is supported upon a two wheeled truck 4.

The saw which I contemplate using is a circular band saw 5 which is mounted for rotation in a framework comprising two side supports or guides 6, these supports being shaped on the arc of the circle described by the saw in the manner shown in the figures. The two side pieces 6 described somewhat over 180 degrees of a circle and serve, therefore, to support and guide the saw as far as possible along that portion of the saw which is out of contact with the work. Mounted in this framework are a series of rollers 7, these rollers being arranged in pairs, one on each side of the flat surface of the blade of the saw. At the lower ends of the arc-shaped frame I have mounted rollers or pulleys 8, these pulleys being grooved centrally to receive the rear edge of the saw blade and adapted to furnish a support or rest for the saw and to guide the same through the stump which is being sawed.

The saw blade is of especially strong and rugged construction to withstand the heavy duty for which it is designed. It is curved transversely, as shown in Fig. 4, on the arc of the circle described by the saw, so as to better adapt the saw to cut a smooth kerf in the stump being severed. It is provided midway between the edges thereof with a series of squared openings 9, these openings being arranged at regular intervals and so spaced as to receive the sprocket teeth upon and operating sprocket 13 and guide sprockets 10 designed to fit therein. Two of these guide sprockets 10 are mounted in the supporting frame 6. The said frame is provided with two pairs of diagonal braces 11 and 11', one of which, 11', serves as a support for the guide wheels 10, the teeth of which are adapted to fit within the openings 9 of the blade and thus serve to prevent lateral movement of the said blade relative to the framework, and thus keep it properly aligned. The axes of the guide wheels 10 are journalled at 12 in the pair of braces 11' so as to rotate by the movement of the blade.

To impart a rotary movement to the blade 5 of the saw, a sprocket wheel 13 is mounted at the rear end of the frame 14 upon which the operative mechanism is journalled. The teeth of this sprocket wheel are designed to fit within the openings 9 in the blade from the outer side of the said blade. The sprocket wheel is mounted upon a sleeve 15 rotatably upon the shaft 16 supported in the frame 14 as previously noted. There is fixed upon the sleeve 15 adjacent the sprocket wheel 13 a crown gear 17. This gear is designed to impart rotation to the sleeve 15 and to the sprocket wheel 13 through operative engagement with a similar crown gear 18 fixed for rotation with the shaft 19 mounted in the frame work 14 at a point spaced forwardly from the shaft 16. The shaft 19 is adapted to be rotated by means of a bevel gear 20 mounted on the said shaft. This bevel gear is positioned to mesh with a smaller bevel gear 21 mounted upon a forwardly extending operating shaft 22.

The frame 14, previously referred to, is shown most clearly in Fig. 3. It comprises a yoke-shaped member, the two ends of which project rearwardly and are secured at 23 to the frame 6 of the saw so as to furnish a firm mounting therefor. The forward end of this yoke comprising the frame 14 is formed into a sleeve 25 which extends forwardly and is journalled for rotation in the frame 24. The forward end of the sleeve 25 is connected with a bevel gear 26 adapted to mesh with a laterally extending gear 27 mounted to rotate with the shaft 28, which shaft extends at right angles to the position of the sleeve 25 and is rotatable in a journal 29 in the frame 24 and also in a plate 30 connected to the frame 2 of the truck. The outer end of the shaft 28 is formed with a crank arm 31 by means of which the shaft may be rotated, thus, through the gears 27 and 26 imparting a rotary movement to the frame 14 upon which the saw is mounted. I am thus enabled to impart to the saw during operation a swinging or pivotal movement about the axis formed by the sleeve 25 mounted or journalled in the frame 24, as shown.

The shaft 22 which extends forwardly from the gear 21 through the frame 14, the sleeve 25 and the gear 26, being at the central axis of this rotation, is not affected by the same and will thus cause the rotation of the intermediate gears of the saw in any position of the saw relative to the supporting framework. The shaft 22 is provided at its forward end with a bevel gear 32 which is adapted to mesh with a smaller bevel gear 33 mounted for rotation with the shaft 34, said shaft being journalled for rotation at opposite sides of the frame 24. The outer end of the shaft 34 is provided with means for connection with a source of power. I have shown, as indicating such a means, a belt pulley 35, but it is obvious that a gear wheel or sprocket wheel, or other similar means, may be used to connect this shaft with any common motive power.

The rearward end of the saw frame 6 is supported by a yoke 36 and to this yoke is secured a rearwardly extending shaft 37 which is rotatably mounted in a supporting block 38 which is itself supported upon the axle of the rear wheels 39.

In the operation of my device the saw is carried on the supporting trucks, as shown, to a position relative to the stump which is to be severed. During transportation of the saw from place to place I contemplate having the framework 6 upon which the saw is mounted placed in a horizontal position so that it will be out of the way of stumps and brush. When it is properly positioned relative to the stump, the saw is rotated by means of the mechanism just described. The rotation of the shaft 34 will act to impart movement through the gear 32, the shaft 22, the gears 21, 20, 18 and 17 to the sprocket wheel 13 which is connected, through the projection of the teeth thereon into the openings 9 of the blade, to cause the running or rotation of said blade within the guide furnished by the frame, the rollers 7 and the idle sprocket wheels 10. The frame 6 is then swung or rotated upon the axis provided by the sleeve 25 and the shaft 37 so as to bring the forward toothed edge 40 of the blade into contact with the stump. The strong construction of the saw enables it to cut through the earth and the wood of the stump and to thereby sever the upper portion of the stump at a point somewhat above the roots and a point materially below the surface of the ground. The section of stump and earth thus severed by the saw will be seen to be in about the shape of a section of a sphere. As the saw is forced downwardly into the ground during its rotation it bears at the rear edge of the blade against the two guide rollers 8 which act to press it firmly against the work.

When one stump has thus been severed the apparatus is moved to a similar position relative to another stump and the process repeated. With a device of this construction it is possible to remove the stumps on a comparatively large area of ground during a very short time. The stumps are severed at a distance below the ground great enough to obtain the most important part of the stump for purposes of obtaining turpentine etc., and at such depth that the remaining portion of the stump will not interfere with the cultivation of the ground. The advantages of this type of device will be clearly apparent. It is a vast labor saving device and will also be of great use in clearing land for cultivation, and in obtaining valuable pine stumps for the purpose of obtaining turpentine and its products. It will also be obvious that small trees, such as mesquite, may be removed with this device without the necessity of previously cutting down the tree. The device, therefore, has a wide use and will serve valuable purposes.

Having thus described my invention, the further objects of which will be apparent to one skilled in the art, what I claim as new and desire to protect by Letters Patent is:

1. In a device of the character described, a support, an arcuate frame thereon, a circular hoop saw mounted for rotation thereon, means to rotate said saw comprising a toothed wheel mounted outside the circle of said saw and placed to fit within spaced openings in said blade, an operating shaft to rotate said wheel and means to swing said frame on the axis of said operating shaft.

2. In a device of the character described, a portable supporting frame pivoted to swing on a horizontal axis, a hoop saw mounted for operation in said frame, said axis being diametrical of the blade of said saw, means on said frame operating through said axis to rotate said saw, and means to swing said frame on its axis during the operation of said saw.

3. In a circular hoop saw, a frame pivoted to rotate about a laterally extending axis, a band saw adapted to run in said frame, the blade of said saw being curved transversely, means to operate said saw, and means to rotate said frame, both said means extending in a direction radial to said frame.

4. In a device of the character described, a rear truck, a front truck, a saw supporting frame pivoted on said trucks said frame constructed on the circumference of a circle, one segment thereof being open, said frame being pivoted on a horizontal axis diametrically thereof, a hoop saw supported for rotation in said frame and having spaced openings in the blade thereof, a sprocket wheel on said frame, the teeth of said wheel engaging the openings in said blade, means to swing said saw on its pivot and means to rotate said sprocket wheel and actuate said saw during the rotation of said frame, said rotating means being driven through the axis of rotation of said frame.

5. In a rotary hoop saw, an arcuate frame, a hoop saw blade mounted therein and having spaced openings in the blade thereof, an operating sprocket wheel adapted to operatively engage said openings, an operating shaft having connection with said sprocket wheel, and means to swing said saw on its diametrical axis about said shaft.

6. In a device of the character described, a circular saw-supporting frame, a lower segment of said frame being open, a pivotal support at each end of said frame, a hoop-saw arranged to rotate in said frame, said saw having spaced openings therein, a sprocket wheel outside the circle of the blade of said saw and engaging the openings therein, supporting and guiding sprocket wheels inside said saw on its support and means to rotate said sprocket wheel and said saw during the operation of said saw.

In testimony whereof, I hereunto affix my signature, this the 13th day of June, A. D. 1921.

JOHN T. CARROLL.